July 30, 1935.  J. R. REYBURN  2,009,521
METHOD AND DEVICE FOR CONTROLLING OSCILLATIONS OF SPRINGS
Original Filed March 25, 1929   2 Sheets-Sheet 1
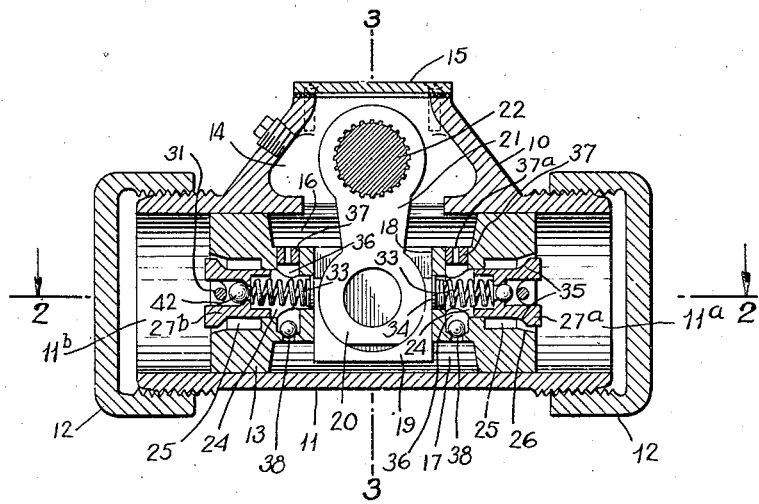
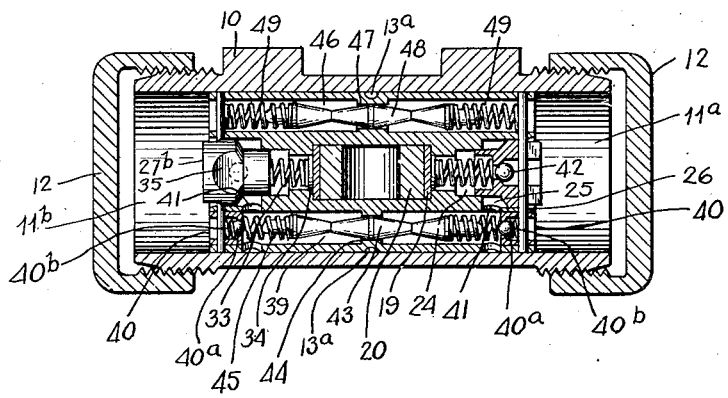
INVENTOR.
JOHN R. REYBURN
BY
ATTORNEY.

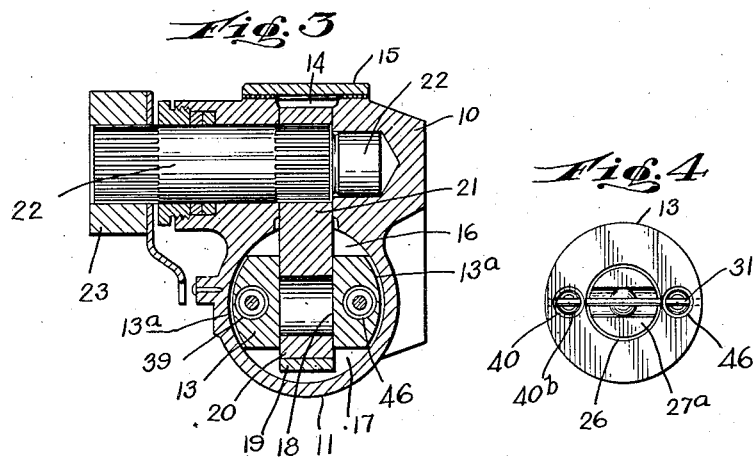
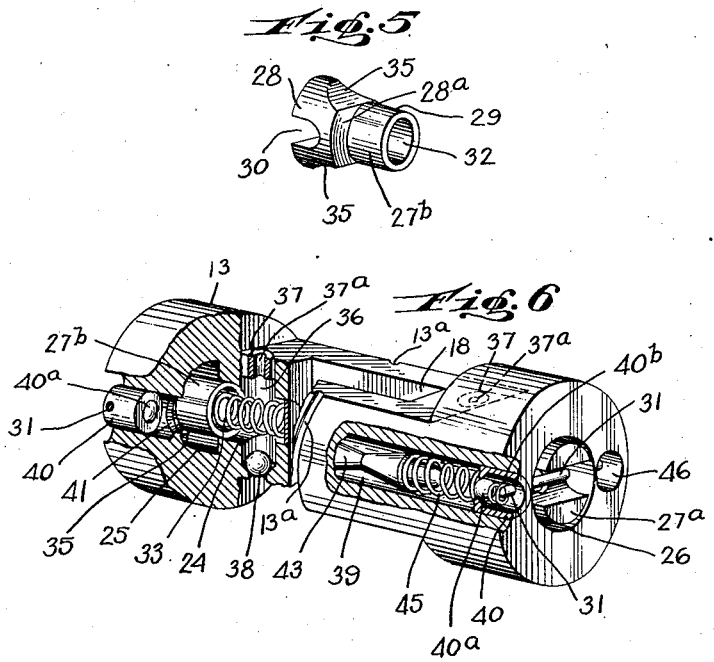

Patented July 30, 1935

2,009,521

UNITED STATES PATENT OFFICE 2,009,521

METHOD AND DEVICE FOR CONTROLLING OSCILLATIONS OF SPRINGS

John R. Reyburn, Fairfield, Conn., assignor to American Chain Company, Inc., a corporation of New York Original application March 25, 1929, Serial No. 349,712. Divided and this application September 21, 1931, Serial No. 563,964

14 Claims. (Cl. 188—88)

This application is a division of my co-pending application for Shock absorbers, Serial No. 349,712, filed March 25, 1929.

My invention relates to improvements in methods and devices for controlling oscillations of springs, such, for instance, as the body-supporting springs of vehicles.

An object of the invention is to control the movement of a spring both on its compression stroke and its expansion stroke.

When a wheel of a rapidly moving vehicle strikes an abrupt obstacle or when, after dropping into a hole in the road, the wheel strikes an abrupt wall on the far side of the hole, there is a sharp upward thrust of the wheel and its axle which will give the body of the vehicle a severe jolt if the body springs are snubbed in the manner heretofore employed on both compression and expansion strokes.

It is an object of the present invention to prevent such sudden jolts by imposing little restraint to the compression of the spring during the short interval of time while the axle moves upward as it strikes the sharp obstruction and then applying a snubbing resistance which increases comparatively gradually.

Another object is to provide similar delayed snubbing on the expansion stroke of the springs so that the vehicle wheels may drop freely into a depression without corresponding drop of the vehicle body.

Much of the discomfort of travel over ordinary roads, particularly at low speeds, is due to comparatively small oscillations of the car body caused by frequent small unevennesses in the road. It is an object of the present invention to overcome such conditions by damping slight movement of vehicle springs.

Still other objects will appear in the following description of an apparatus embodying my invention and thereafter the novelty and scope of the invention will be pointed out in the claims.

In the accompanying drawings:

Figure 1 is a view in longitudinal section of my improved hydraulic shock absorber;

Fig. 2 is a view in section taken on the line 2—2 of Fig. 1;

Fig. 3 is a view in section taken on the line 3—3 of Fig. 1;

Fig. 4 is an end view of a piston used in the shock absorber, as viewed from the right hand side of Fig. 1;

Fig. 5 is a view in perspective of one of the plungers used in the piston; and

Fig. 6 is a view in perspective of the piston partly broken away to illustrate interior details.

The shock absorber comprises a casing 10 which is formed with a cylinder portion 11 closed at each end by means of caps 12 screwed thereon. Within the cylinder 11 there is a double headed piston 13 which divides the cylinder into a pair of working chambers 11a and 11b. The casing 10 is also formed with an intermediate supply chamber 14 closed at the top by a cover 15 and communicating at the bottom with the cylinder. The piston is cut away at the top and bottom intermediate its ends to form recesses 16 and 17. The recess 16 is always in communication with the supply chamber 14 and virtually forms part of the supply chamber, while recess 17 is also in communication with the supply chamber through circumferential grooves 13a formed in the piston.

Formed in the piston and extending from recess 16 to recess 17 is a rectangular slot 18. Fitted to slide vertically within this slot 18 is a shoe 19 provided with an arcuate recess to receive a knob 20 formed on the end of a crank arm 21. The arcuate recess is somewhat more than 180 degrees in extent, so that the shoe 19 will cling to the knob 20. It will be understood, that the shoe 19 is applied to the knob before it is inserted into the slot. The crank arm 21 is fixed upon a transverse shaft 22 which projects from the casing through a suitable stuffing box and at its outer end carries an arm 23, Fig. 3, by which the shaft may be oscillated. Oscillation of the shaft 22 will result in reciprocation of the piston 13 in the cylinder 11, the shoe 19 rising and falling as the arm 21 swings away from and toward vertical position.

The piston 13 is axially bored to form, at opposite ends thereof, a pair of inner valve chambers 24 and a pair of outer valve chambers 25 communicating with the inner chambers. The outer chambers are of larger diameter than the inner chambers and are formed at their outer ends with flaring mouths 26 which open into the working chambers 11a and 11b respectively. The valve chambers 24 may communicate at their inner ends with the slot 18.

Adapted to operate within the valve chambers at each end of the piston is a plunger valve. The plunger valves are identical in form, but, for convenience in describing the operation of the shock absorber hereinafter, the valve at the right hand end of the piston is designated by the numeral 27a and that at the left hand end by the numeral 27b. As shown in Fig. 5, each plunger valve has a head portion 28 and a reduced neck portion 29, the former being of a diameter to fit the outer valve chamber 25 and the latter of a diameter to fit the inner valve chamber 24. The head 28 is formed at its outer end with a slot 30 to receive a retaining pin 31 transversely disposed in the piston, while the neck 29 is formed with a recess 32 to receive one end of a compression spring 33. The opposite end of the spring is seated in the chamber 24 and presses against a disk 34 which, in turn, bears against the shoe 19. This construction, it will be understood, is the same at each end of the piston. Each plunger valve is thus normally pressed outward by a spring 33 against a retaining pin 31.

As clearly shown in Figs. 1 and 5, the head 28 of each plunger is sliced away on opposite sides thereof to form channels 35 which, when the plunger is in its outermost position, open into the flaring mouth of the valve chamber 25, and provide communication between said valve chamber and the adjacent working chamber of the cylinder. As the plunger is depressed or pushed inward, the channels 35 are gradually constricted and are finally cut off entirely when they are moved out of communication with the flaring mouth of the valve chamber.

To permit of moving the plunger inward it is necessary to vent the oil in the valve chamber 24, and to this end the piston is provided at each end with a transverse bore 36 which intersects the chamber 24 and extends from the recess 16 to the recess 17. One end of this bore is closed by a plug 37 having an aperture 37a therethrough; while in the other end is seated a ball valve 38 which closes the bore against outlet of oil from the chamber 24, but freely admits oil therein from the recess 17. Thus, the plunger valve can move inwardly only as fast as oil can escape at the aperture 37a and said aperture is of such size as to provide a predetermined resistance to movement of the plunger valve.

Parallel to the central bore of the piston, and in a radial plane transverse to that of the bores 36 is a duct 39 which, as a matter of convenience in manufacture, may be drilled from end to end of the piston, after which the ends of the duct may be closed by plugs 40, the plugs being held in place by means of the pins 31. Communication is provided between each valve chamber 25 and the duct 39 through ports 41. These ports may be conveniently drilled transversely through the outer wall of the piston to intersect the duct 39 and the chambers 25. When the piston is fitted into the cylinder, the cylinder wall closes the openings drilled into the outer wall of the piston so that it is not necessary to plug these openings.

Each plunger valve is centrally bored and provided with a ball valve 42 which opens outward or toward the working chamber. Thus, oil can be fed from supply chamber 14 into either chamber 24 by way of the ball valve 38 leading therein, and thence by way of ball valve 42 of the adjacent plunger valve into the adjacent working chamber of the cylinder. Such flow will take place whenever there is a shortage of oil in the working chamber.

The operation of the shock absorber as so far described is as follows:

Figures 1 and 2 show the position of the parts under normal conditions, with chambers 11a and 11b filled with oil and supply chamber 14 containing oil to a level above the top of the cylinder 11. For the present, at least, we may ignore certain valve mechanism (to be described later) in the duct 39, and consider that there is substantially open communication between the working chambers 11a and 11b through channels 35, chambers 25, ports 41, and duct 39.

When the vehicle rides over any unevenness in the road the shaft 22 is oscillated, swinging the arm 21, and causing the piston 13 to reciprocate in the chamber 11. Let us assume that on compression of the spring, the movement of the piston is toward the right or into the working chamber 11a, and upon expansion of the spring the movement is in the opposite direction. When movement takes place toward the right, a certain amount of pressure will be developed in the chamber 11a, causing fluid to flow therefrom through channels 35 of plunger valve 27a into the adjacent chamber 25 and thence through port 41 and duct 39 to the opposite chamber 25, from which it may escape by way of channels 35 of valve 27b into the working 11b. Thus, there will be a transfer of oil from the contracting chamber 11a directly into the expanding chamber 11b. Of course there will be a certain amount of resistance to movement of the oil through the various passages and there will be a differential pressure on the outer face of the plunger 27a with respect to that against the inner face 28a (Fig. 5) of the head of the plunger, hence there will be a tendency to force the plunger inward against the developing oil pressure in chamber 24 and against the pressure of the spring 33. Such movement, however, will be resisted by reason of the constricted passage through the plug 37a, because the plunger can enter the chamber 24 only as fast as the oil displaced thereby is vented from the chamber, and the rate of venting of the oil is limited by the size of the orifice 37a. By reason of the resistance offered by vent hole 37a, depression of the plunger will be delayed and there will be a gradual closing of communication between the chamber 25 and the working chamber 11a. The rate at which this closure takes place, for any given speed of spring movement, can be controlled by proper selection of the taper or flare of the mouth 26 and the shape of the channels 35. In this manner, a resistance will be built up to movement of the piston which will damp oscillation of the spring, producing a pressure-travel curve of any desired form, depending upon the selection of the controlling factors above referred to.

When the plunger 27a is completely depressed further contraction of the working chamber will result in forcing oil to leak out around the piston and between the plunger valve and the chambers in which it fits. In the meantime as the chamber 11b expands, any deficiency of the oil coming from the opposite chamber 11a will be made up from the adjacent chamber 24 through the check valve 42 in plunger 27b. Said chamber 24, at the same time, will levy upon the oil in supply chamber 14, drawing in oil by way of its check valve and its port 37a.

On the return stroke of the piston the same condition takes place but in the opposite direction. Oil displaced from the chamber 11b will at first flow through channels 35 of valve 27b and thence into the adjacent chamber 25 and by way of duct 39 and valve 27a into the chamber 11a.

The plunger valve 27a will readily move outward to normal position under impulse of its spring 33 and also under pressure of oil in chamber 25 against the shoulder 28a of said plunger valve. In other words, immediately after each reversal of the piston, oil discharged from the working chamber that is now contracting will assist in opening the plunger valve of the opposite working chamber if said valve has not already been opened by its spring 33. In the meantime the ball valve 38 of the chamber 24 in which said plunger valve operates will readily open to fill the chamber with oil and hence there will be no hindrance to the rapid opening of the plunger valve.

To guard against the development of high pressures in the duct 39 each plug 40 is provided with a ball check valve 40a opening inward or away from the adjacent working chamber. A light spring 40b holds each check valve normally closed. The springs 40b are very light and offer practically no resistance to sudden shocks. Without these ball check valves it is conceivable that upon reversal of the piston, the plunger valve of the now expanding working chamber if previously completely closed might not open quickly enough in the case of a sudden shock, and considerable force might be imparted to the piston before said plunger valve was opened to vent the excess pressure. This difficulty is overcome by the ball check valves 40a.

As soon as the plunger 27b has been fully depressed by sustained pressure in chamber 11b, a maximum resistance to expansion of the vehicle spring will be exerted and will be maintained at a substantially constant value as the piston moves past its normal central position and continues toward the left. Thus each stroke of the spring will be damped by resistance to transfer of oil from one working chamber to the other, but during an initial part of each stroke the resistance will be low, and will then gradually build up to a maximum at a rate which is controlled by the strength of the spring 33, the size of the aperture 37a, the shape of the channels 35, and the flare of the mouth 26 at the compressing end of the piston.

In order to take care of slight spring movements the duct 39 may be equipped with a balanced valve 43, as clearly shown in the drawings It will be observed that the duct 39 is centrally reduced to form a valve seat 44, and the valve 43 which is slidable in the seat, normally occupies a central position therein. The body of the valve 43 is conically tapered to a smaller diameter at each side of the valve seat, so that displacement of the valve in either direction will open communication through the duct 39. The valve 43 is held in balanced position by a pair of opposed springs 45 which bear against opposite ends thereof and are backed against the plugs 40. Thus, communication between chamber 11a and 11b will normally be closed by the valve 43, but the springs 45 are very light and will yield to a very light differential pressure. The snubbing effect produced by the valve 43 is normally just sufficient to take care of small spring movements and may be regulated by varying the taper of the conical body of the valve and also by varying the strength of the springs 45.

Instead of depending upon leakage to take care of displacement of oil when the plunger valves are closed, a high pressure valve may be employed as follows: Diametrically opposite the duct 39 the piston may be provided with a second duct 46 extending completely therethrough and opening into the two working chambers. This duct is centrally reduced to form a valve seat 47. The valve seat is engaged by a balanced valve 48, similar in general construction to the valve 43. The valve 48 is held in balanced condition by a pair of opposed springs 49 which are retained at their outer ends by means of the pins 31. It will be observed that the seat 47 is much broader than the seat 44, so that considerable movement of the valve 48 may take place before it will open; also the springs 49 are made much stiffer than the springs 45. As a consequence, the valve 48 will prevent communication between the chambers 11a and 11b until a considerable pressure has been built up in one or the other of the chambers. This pressure may be of any predetermined value and, furthermore, by varying the taper of the valve body the relief afforded by the valve 48 may be graduated as desired. By means of the valves 43 and 48 the pressure travel curves on small and large spring movements may be controlled individually, and since the taper on one side of said valves need not be the same as that on the other the snubbing effect on expansion may be made different from that on compression of a vehicle spring. The plugs 37 may be readily replaced with plugs having apertures of a different size and the aperture 37a at one end of the piston may be larger or smaller than that at the other end to provide quicker action of one plunger valve than the other.

It will be observed that the pins 31 serve not only as retainers for the plunger valves but also as retainers for the ball valves 42. The springs 33 serve to retain the ball valves 38.

While I have illustrated a shock absorber provided with balanced valves 43 and 48, the device will operate very satisfactorily without either or both of these valves. When the valve 48 is omitted the duct 46 must either be omitted or plugged.

Having thus described my invention what I claim and desire to secure by Letters Patent is as follows:

1. The method of damping oscillations of a spring which includes the steps of employing the energy of the spring to exert pressure upon two bodies of liquid, using said pressure to force liquid from each body through an orifice individual thereto and controlling the size of the orifice of one body by variations of volume of the other body.

2. The method of damping oscillations of a spring which includes the steps of employing the energy of the spring to exert pressure on two bodies of liquid, using said pressure to force liquid from each body through an orifice individual thereto, and reducing the area of the orifice of one body in predetermined relation to the reduction of volume of the other body.

3. The method of damping oscillations of a spring which includes the steps of employing the energy of the spring to exert pressure upon two liquid bodies, using said pressure to force liquid from each body through an orifice individual thereto, employing the pressure of one body to constrict the orifice individual thereto, and controlling such constriction in predetermined proportion to the reduction of volume of the other body.

4. The method of damping oscillations of a spring which includes the steps of employing the energy of the spring to exert pressure on two bodies of liquid, employing said pressure to cause discharge of liquid from one body through a variable orifice and from the other body through a fixed orifice, utilizing the pressure in the former body to constrict the variable orifice, and controlling the constriction of the variable orifice in predetermined relation to variations of volume of said other body.

5. The method of damping oscillations of a spring which includes the steps of employing the energy of the spring to exert pressure on a liquid body and cause the liquid to discharge through an orifice, utilizing the pressure of the liquid to close the orifice, hydraulically controlling the rate of closure of the orifice, and applying auxiliary resistance to the discharge of the liquid from said body.

6. The method of retarding oscillations of a spring which includes the steps of applying the energy of the spring to force a liquid through an orifice, utilizing the pressure of the liquid to close the orifice, and applying pressure upon the liquid discharged from the orifice to produce back pressure at the orifice.

7. The method of damping oscillations of a spring which includes the steps of applying the energy of the spring to exert pressure on a body of liquid and cause discharge of the liquid through an orifice, utilizing the pressure of the liquid to close the orifice, hydraulically controlling the rate of closure of the orifice, and applying a low spring resistance to the discharge of the liquid.

8. The method of damping oscillations of a spring which includes the steps of applying the energy of the spring to exert pressure on a body of liquid and cause discharge of the liquid through an orifice, utilizing the pressure of the liquid to close the orifice, hydraulically controlling the rate of closure of the orifice, applying a low spring resistance to the discharge of the liquid, and permitting auxiliary discharge of the liquid when the pressure in the body exceeds a predetermined value.

9. In a hydraulic shock absorber comprising, in part, a casing containing a liquid, a liquid-displacing member, and a compression space having means for the escape of liquid therefrom, the provision therewith of means to effect a variation in the capacity of the means for escape of liquid from the compression space; said provision consisting of a metering valve controlling the volume of escape of liquid from the compression space, said metering valve being normally maintained in an open position by means of a spring, and being so disposed as to be closable by the pressure of liquid arising in said compression space; an abutment having a stationary position relative to the closing motion of the metering valve; a liquid-containing compression chamber cooperating with the metering valve and the abutment to provide a substantially complete hydraulic resistance to the effort of the liquid pressure in the compression space to close the metering valve; and means to permit a controlled escape of liquid from the compression chamber, whereby a corresponding control of the closing of the metering valve by the effort of the liquid pressure in the compression space is effected.

10. In a hydraulic mechanism comprising a main compression chamber containing a liquid and a liquid-displacing member, the provision therewith of a liquid-metering means to regulate the escape of liquid from the main compression chamber consisting of a piston reciprocable within a compression chamber formed within the liquid-displacing member, a passage for the communication of liquid between the main compression chamber and the compression chamber within the liquid-displacing member, and a check valve controlling said passage and operative upon a compressive movement of the liquid-displacing member to prevent the passage of liquid from the main compression chamber to the compression chamber within the liquid-displacing member; said piston having a motion relative to the liquid-displacing member effected by pressure of liquid within the main compression chamber upon the piston, said motion being controlled by the escape of liquid from the compression chamber in the liquid-displacing member, the piston and the liquid-displacing member being so shaped and disposed with relation to each other as to form an orifice or orifices from the main compression chamber of a capacity gradually decreasing with the motion of the piston relative to the liquid-displacing member.

11. A shock absorber comprising in combination a main compression chamber containing a liquid and a reciprocable liquid-displacing member, a chamber within the liquid-displacing member, a check valve permitting entrance of liquid into the main compression chamber and preventing egress of liquid therefrom, a liquid-metering member reciprocable within the chamber of the liquid-displacing member and operable by the pressure of liquid in the main compression chamber, a compression space within the chamber of the liquid-displacing member, means to permit a free entrance of liquid thereinto, means operable by a compressive movement of the liquid-displacing member to cut off said free entrance of liquid during said movement, and means to permit a restricted escape of liquid from said compression space during said movement, said compression space being so disposed with relation to the liquid-metering member as to control the reciprocation thereof by the escape of liquid from said compression space, and means to normally maintain the liquid-metering member in open relation with the main compression chamber.

12. In a hydraulic shock absorber comprising a piston chamber containing a liquid, a liquid-displacing member, and a compression space having means for the escape of liquid therefrom, the provision of means to effect a variation in the capacity of the means for escape of liquid from the compression space of piston chamber, said provision consisting of a metering valve to control the volume of escape of liquid from the compression space of piston chamber, an abutment having a stationary position relative to a closing motion of the metering valve, and a metering-valve-controlling compression chamber interposed between the stationary abutment and the metering valves; said metering valve having a normally open position and being so disposed as to be closable by the pressure of liquid arising in the compression space of the piston chamber from a compressive movement of the liquid-displacing member; said metering-valve-controlling compression chamber having provision to prevent entrance of liquid thereinto during said compressive movement of liquid-displacing member, and provision to permit a restricted escape of liquid therefrom during said compressive movement of liquid-displacing member, whereby the effort of the liquid pressure in the compression space of piston chamber to close the metering valve is controlled in correlation with the restricted escape of liquid from the metering-valve-controlling compression chamber.

13. A retarding device having hydraulic means to effect a progressively increasing degree of retardation, said means consisting of a valve containing an orifice of variable capacity and a dashpot to control the variation of capacity of said orifice, the dashpot having communicatory means for the entrance and egress of liquid thereinto and therefrom, and means operative during periods of retardation to restrict the capacity of said communicatory means.

14. A hydraulic retarding device having means to provide a varying degree of retardation, said means consisting of a valve having escape means of variable capacity, a dashpot in juxtaposition with the valve and cooperating therewith to effect a variation in the capacity of said escape means, the dashpot having communicatory means for the entrance and egress of liquid into and from the dashpot, and means operative during a period of retardation to vary the capacity of said communicatory means, whereby the variation of capacity of said escape means is effected.

JOHN R. REYBURN.